(12) United States Patent
Winkler et al.

(10) Patent No.: US 8,505,285 B2
(45) Date of Patent: Aug. 13, 2013

(54) CATALYST AND METHOD OF MANUFACTURE

(75) Inventors: Benjamin Hale Winkler, Albany, NY (US); Dan Hancu, Clifton Park, NY (US); Daniel George Norton, Niskayuna, NY (US); Ashish Balkrishna Mhadeshwar, Storrs, CT (US)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 12/899,429

(22) Filed: Oct. 6, 2010

(65) Prior Publication Data

US 2012/0087838 A1   Apr. 12, 2012

(51) Int. Cl.
*F01N 3/10* (2006.01)

(52) U.S. Cl.
USPC ............. 60/303; 60/274; 60/286; 60/297; 60/299; 502/74; 502/78; 502/261; 502/349; 423/213.5; 423/239.1

(58) Field of Classification Search
USPC ............ 60/274, 286, 295, 297, 299, 301, 60/303; 502/60, 74, 77, 78, 150, 261, 262, 502/332, 333, 339, 349, 350, 415; 423/213.5, 423/239.1
See application file for complete search history.

(56) References Cited

U.S. PATENT DOCUMENTS

| | | | |
|---|---|---|---|
| 5,710,093 A | 1/1998 | Rivas et al. | |
| 7,081,231 B1 | 7/2006 | Aardahl et al. | |
| 7,090,811 B2 | 8/2006 | Cho et al. | |
| 7,093,429 B1 | 8/2006 | Cho | |
| 7,135,153 B2 | 11/2006 | Bartley et al. | |
| 7,803,338 B2 * | 9/2010 | Socha et al. | 423/239.1 |
| 8,034,311 B2 * | 10/2011 | Ikeda et al. | 423/213.5 |
| 8,037,674 B2 * | 10/2011 | Kupe et al. | 60/286 |
| 8,258,070 B2 * | 9/2012 | Fujdala et al. | 502/60 |
| 2004/0076565 A1 | 4/2004 | Gandhi et al. | |
| 2006/0228283 A1 | 10/2006 | Malyala et al. | |
| 2008/0131345 A1 | 6/2008 | Vitse et al. | |
| 2008/0219906 A1 | 9/2008 | Chen et al. | |
| 2009/0068093 A1 | 3/2009 | Cho et al. | |
| 2009/0074641 A1 * | 3/2009 | Lewis et al. | 423/213.2 |
| 2010/0196236 A1 | 8/2010 | Lewis et al. | |
| 2010/0196237 A1 | 8/2010 | Yin et al. | |

FOREIGN PATENT DOCUMENTS

EP    2298433 A1    3/2011

OTHER PUBLICATIONS

European Search Report Mailed Feb. 8, 2012 for EP11183712.
U.S. Appl. No. 12/903,908, filed Oct. 13, 2013, Lewis et al.
U.S. Appl. No. 12/550,970, filed Aug. 31, 2009, Lewis et al.
U.S. Appl. No. 12/897,650, filed Oct. 4, 2010, Lewis et al.

(Continued)

*Primary Examiner* — Binh Q. Tran
(74) *Attorney, Agent, or Firm* — Jean K. Testa

(57) ABSTRACT

A catalyst system includes a first catalytic composition and a second catalytic composition. The first catalytic composition includes a homogeneous solid mixture, which includes a first catalytic material disposed on a first substrate. The pores of the solid mixture have an average diameter of greater than about 45 nanometers. The second catalytic composition includes at least one of a zeolite or a second catalytic material disposed on a second substrate. The second catalytic material includes an element selected from the group that includes tungsten, titanium, and vanadium.

28 Claims, 4 Drawing Sheets

(56) References Cited

OTHER PUBLICATIONS

Bao, X., et al; "Synthesis of Hydroxyapatite/Alumina Nanocomposites Via Microemulsions," 27th International Cocoa Beach Conference on Advanced Ceramics and Composites: A; Ceramic Engineering & Science Proceedings; vol. 24, Issue 3; pp. 51-56; 2003 (7 pages).

Chandradass, J., et al; "Synthesis and Characterization of Alumina Nanoparticles by Igepal CO-520 Stabilized Reverse Micelle and Sol-Gel Procesing," Materials and Manufacturing Processes, 23:494-498; 2008 (5 pages).

Flura, A., et al; "Role of the alumina surface properties on the ammonia production during the NOx SCR with ethanol over Ag/$Al_2 O_3$ catalysts," presented during The Sixth Tokyo Conference on Advanced Catalytic Science and Technology (TOCAT6) and the Fifth Asia Pacific Congress on Catalysis (APCAT5), Sapporo, Japan; 2010 (2 pages).

Kim, P., et al. "Selective catalytic reduction of NO By monoethanolamine over Ag/$Al_2 O_3$ catalyst," presented during the the Sixth Tokyo Conference on Advanced Catalytic Science and Technology (TOCAT6) and The Fifth Asia Pacific Congress on Catalysis (APCAT5), Sapporo, Japan, 2010 (2 pages).

Parvulescu, V. I., et al; "Sol-gel entrapped nano silver catalysts-correlation between active silver species and catalytic behavior," Journal of Catalysis; pp. 1-9; 2010 (9 pages).

Shimokawabe, M., et al. "SCR of NO By DME over $Al_2 O_3$ based catalysts: Influence of noble metals and Ba additive on low-temperature activity," presented duting The Sixth Tokyo Conference on Advanced Catalytic Science and Technology (TOCAT6) and The Fifth Asia Pacific Congress on Catalysis (APCAT5), Sapporo, Japan; 2010 (2 pages).

Theis, J.; "SCR Catalyst Systems Optimized for Lightoff and Steady-State Performance," presented during the SAE World Congress & Exhibition, Detroit, MI; pp. 383-392;2009 (10 pages).

Parks, J.E., II, et al.; "NOX Reduction with Natural Gas for Lean Large-Bore Engine Applications Using Lean NOX Trap Aftertreatment," Oak Ridge National Laboratory; available at www.ornl.gov/~webworks/cppr/y2001/rpt/122012.pdf; 2004 (9 pages).

Gilot, P., et al; "A review of $NO_x$ reduction on zeolitic catalysts under diesel exhaust conditions," Fuel, vol. 76, No. 6, pp. 507-515, 1997 (9 pages).

\* cited by examiner

CATALYST AND METHOD OF MANUFACTURE

BACKGROUND OF THE INVENTION

The subject matter disclosed herein relates to catalysts and methods for making catalysts, and more particularly, catalysts for removing nitrogen oxides ($NO_x$) from exhaust gas streams.

Current emission control regulations encourage the use of catalysts in the exhaust systems of vehicles in order to convert carbon monoxide (CO), hydrocarbons (HC), and $NO_x$ produced during engine operation into less harmful exhaust gases. Vehicles equipped with diesel engines may offer the benefit of increased fuel economy. Such vehicles may benefit from exhaust after-treatment systems that employ one or more catalysts to assist in chemically converting $NO_x$, HC, CO, and other pollutants into less harmful compounds prior to discharge of the exhaust gases to the environment.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a catalyst system includes a first catalytic composition and a second catalytic composition. The first catalytic composition includes a homogeneous solid mixture, which includes a first catalytic material disposed on a first substrate. The pores of the solid mixture have an average diameter of greater than about 45 nanometers. The second catalytic composition includes at least one of a zeolite or a second catalytic material disposed on a second substrate. The second catalytic material includes an element selected from the group that includes tungsten, titanium, and vanadium.

In a second embodiment, a catalyst system includes a first catalytic composition, a second catalytic composition, and a third catalytic composition. The first catalytic composition includes a first catalytic material disposed on a first substrate. The second catalytic composition includes at least one of a zeolite or a second catalytic material disposed on a second substrate. The second catalytic material includes an element selected from the group that includes tungsten, titanium, and vanadium. The third catalytic composition is disposed downstream from the second catalytic composition and includes a third catalytic material disposed on a third substrate. The third catalytic material is selected from the group consisting of platinum, palladium, ruthenium, rubidium, osmium, and iridium.

In a third embodiment, an exhaust system includes a fuel delivery system configured to deliver a fuel to an engine, an exhaust stream path configured to receive an exhaust stream from the engine, a reductant delivery system configured to deliver a reductant to the exhaust stream path, and a catalyst system disposed in the exhaust stream path. The catalyst system includes a first catalytic composition and a second catalytic composition. The first catalytic composition includes a homogeneous solid mixture, which includes a first catalytic material disposed on a first substrate. The pores of the solid mixture have an average diameter of greater than about 45 nanometers. The second catalytic composition includes at least one of a zeolite or a second catalytic material disposed on a second substrate. The second catalytic material includes an element selected from the group that includes tungsten, titanium, and vanadium.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
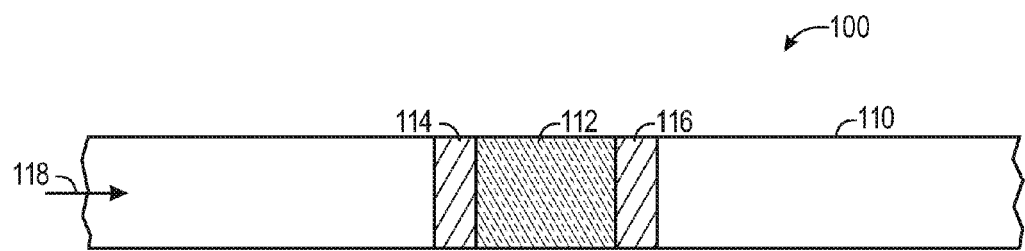
FIG. 1 is a schematic diagram depicting a catalyst system set-up in a furnace in accordance with an embodiment of the invention.

The systems and techniques described include embodiments that relate to catalysts and their use and manufacture. Other embodiments relate to articles that include catalysts and catalytic compositions that may chemically reduce $NO_x$ that is present in emissions generated during combustion, for example in furnaces, ovens, engines, locomotives, and so forth.

A "catalyst" is a substance that can cause a change in the rate of a chemical reaction without itself being consumed in the reaction. A "slurry" is a mixture of a liquid and finely divided particles. A "sol" is a colloidal solution. A "powder" is a substance including finely divided solid particles. A "monolith" may be a ceramic block having a number of channels, and may be made by extrusion of clay, binders and additives that are pushed through a dye to create a structure. "Light-off temperature" is the catalyst temperature at which fifty percent (50%) of the emissions from the engine convert as they pass through the catalyst. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

One or more specific embodiments of the present invention are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components unless otherwise stated. As used herein, the terms "disposed on" or "deposited over" or "disposed between" refers to both secured or disposed directly in contact with and indirectly by having intervening layers therebetween.

The catalyst system described herein employs a multiple bed catalyst system comprising at least a first catalytic composition and a second catalytic composition to reduce the $NO_x$ in an exhaust gas. The first catalytic composition produces nitrogen containing chemicals such as ammonia. Specifically, the first catalytic composition may include a first catalytic material disposed on a first substrate. In certain embodiments, the first catalytic material may include silver. In other embodiments, the first catalytic material and the first substrate may be combined in a homogeneous solid mixture that has pores with an average diameter greater than about 45 nanometers. In such embodiments, the first catalytic material may include at least one catalytic metal and the first substrate may include at least one metal inorganic support. In further embodiments, the first catalytic composition may include at least one promoting metal.

The second catalytic composition comprises either a second catalytic material disposed on a second substrate or a zeolite. In certain embodiments, the second catalytic material includes an element selected from tungsten, titanium, or vanadium. The second catalytic composition may use the ammonia or ammonia-like products generated by the first catalytic composition as a $NO_x$ reductant to further reduce additional $NO_x$ in the exhaust gas. The second catalytic composition may also oxidize any unwanted products of reaction or unused reactants or reductants. The catalyst system may further include a third catalytic composition used to further oxidize any unwanted products of reaction or unused reactants or reductants. Thus, the third catalytic composition may work together with the first and second catalytic compositions to reduce $NO_x$ in the exhaust gas. The third catalytic composition may include a third catalytic material disposed on a third substrate. The catalyst systems described herein may further employ a hydrocarbon reductant, such as diesel fuel. One advantage of using diesel fuel as a reductant is that it is readily available on board vehicles with diesel engines. In certain embodiments, a co-reductant may be used with the hydrocarbon reductant to lower a light off temperature of the catalyst.

Turning to the first catalyst composition in more detail, the first catalytic material may be present in the first catalytic composition in an amount up to about 50 mole percent. For example, the first catalytic material may be present in the first catalytic composition in an amount between about 0.025 mole percent to 50 mole percent, 0.5 mole percent to 40 mole percent, or 1.0 mole percent to 30 mole percent. In one embodiment, the amount of first catalytic material in the first catalytic composition is about 1.5 mole percent. In another embodiment, the amount of first catalytic material in the first catalytic composition is about 5 mole percent.

In one embodiment, the catalytic metal may include alkali metals, alkaline earth metals, and transition metals. Suitable transition metals that may be used as the catalytic metal may include silver, platinum, gold, palladium, iron, nickel, cobalt, gallium, indium, ruthenium, rhodium, osmium, iridium, or combinations of at least two of the foregoing metals. In one embodiment, the catalytic metal is selected from one or more of gallium, indium, and silver. In one embodiment, the catalytic metal is silver.

In various embodiments, the catalytic metal may be present in the first catalytic composition in an amount greater than about 0.25 mole percent. The amount of the catalytic metal selected may be based on end use parameters, economic considerations, desired efficacy, and the like. For example, the amount of the catalytic metal present in the first catalytic composition may be between about 0.25 mole percent to 10 mole percent, 0.5 mole percent to 9 mole percent, 1 mole percent to 8 mole percent, or 1.5 mole percent to 6 mole percent.

In one embodiment, the metal inorganic support may include an inorganic material. As used herein, the phrase "metal inorganic support" means a support that includes an inorganic material, which in part contains atoms or cations of one or more of the metal elements. Suitable inorganic materials may include, for example, oxides, carbides, nitrides, hydroxides, oxides, carbonitrides, oxynitrides, borides, or borocarbides. In one embodiment, the inorganic oxide may have hydroxide coatings. In one embodiment, the inorganic oxide may be a metal oxide. The metal oxide may have a hydroxide coating. Other suitable metal inorganics may include one or more metal carbides, metal nitrides, metal hydroxides, metal carbonitrides, metal oxynitrides, metal borides, or metal borocarbides. Metal cations used in the foregoing inorganic materials can be transition metals, alkali metals, alkaline earth metals, rare earth metals, or the like.

Examples of suitable inorganic oxides include, but are not limited to, silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (for example, FeO, beta-$Fe_2O_3$, gamma-$Fe_2O_3$, beta-$Fe_2O_3$, $Fe_3O_4$, or the like), calcium oxide (CaO), and manganese dioxide (MnO2 and $Mn_3O_4$). Examples of suitable inorganic carbides include, but are not limited to, silicon carbide (SiC), titanium carbide (TiC), tantalum carbide (TaC), tungsten carbide (WC), hafnium carbide (HfC), or the like. Examples of suitable nitrides include, but are not limited to, silicon nitrides ($Si_3N_4$), titanium nitride (TiN), or the like. Examples of suitable borides include, but are not limited to, lanthanum boride ($LaB_6$), chromium borides (CrB and CrB), molybdenum borides ($MoB_2$, $Mo_2B_5$ and MoB), tungsten boride ($W_2B_5$), or the like. In one embodiment, the inorganic substrate is alumina. The alumina employed may be crystalline or amorphous. In one embodiment, the porous metal inorganic support includes porous alumina and the catalytic metal includes silver.

The porous metal inorganic support may be made up of particles. The particles may be agglomerates, a sintered mass, a surface coating on a support, or the like. An average exemplary first catalytic composition particle size is less than about 100 nanometers. In one embodiment, the average first catalytic composition particle size may be between about 0.1 nanometers to 1 nanometer, 1 nanometer to 5 nanometers, 5 nanometers to 15 nanometers, 15 nanometers to 25 nanometers, 25 nanometers to 50 nanometers, or greater than about 50 nanometers.

In one embodiment, the metal inorganic support has pores. The porous metal inorganic support is a reaction product of adding an inorganic oxide to a reversed microemulsion that includes a mixture of a catalytic metal salt, a templating agent, and a solvent. A method includes adding the inorganic oxide to the reversed microemulsion to form a slurry and calcining the slurry to form a porous metal inorganic support that is capable of supporting a catalyst composition. The metal inorganic support may be manufactured via a process, as described in co-pending U.S. patent application Ser. No. 12/897,650, which is incorporated by reference herein in its entirety. As used herein, without further qualifiers, porous refers to a material containing pores with diameters greater than about 45 nanometers.

In one embodiment, the average pore size of the metal inorganic support is controlled and may be selected to reduce or eliminate poisoning. Poisoning may affect catalytic ability, and may be caused by aromatic species present in the reductant or in the exhaust gas stream. The porous material described herein may be more resistant to poisoning from an aromatic containing reductant than a baseline typical gamma phase alumina impregnated with silver.

In one embodiment, the metal inorganic support has a mean pore size greater than about 0.5 nanometers. For example, the metal inorganic support may have an average diameter of pores between about 1 nanometer to 15 nanometers, 2 nanometers to 12 nanometers, 3 nanometers to 15 nanometers, or 1 nanometer to 5 nanometers. The average diameter of pores may be measured using nitrogen adsorption measurements with the Brunauer Emmett Teller (BET) method. The BET theory explains the physical adsorption of gas molecules on a solid surface and serves as the basis for the measurement of the specific surface area of a material.

In certain embodiments, the pore size has a narrow monomodal distribution. In one embodiment, the pores have a pore size distribution polydispersity index that is less than about 1.5, less than about 1.3, or less than about 1.1. In one embodiment, the distribution of diameter sizes may be bimodal, or multimodal.

In one embodiment, the pores may be distributed in a controlled and repeating fashion to form a pattern. In another embodiment, the pore arrangement is regular and not random. As defined herein, the phrase "pore arrangement is regular" means that the pores may be ordered and may have an average periodicity. The average pore spacing may be controlled and selected based on the surfactant selection. In one embodiment, the pores are unidirectional, are periodically spaced, and have an average periodicity. One porous metal inorganic support has pores that have a spacing of greater than about 20 Angstroms. For example, the spacing may be between about 30 Angstroms to 300 Angstroms, 50 Angstroms to 200 Angstroms, or 60 Angstroms to 150 Angstroms. The average pore spacing (periodicity) may be measured using small angle X-ray scattering. In another embodiment, the pore spacing is random.

The porous metal inorganic support may have a surface area greater than about 50 square meters per gram. For example, the porous metal inorganic support may have a surface area between about 50 square meters per gram to 2000 square meters per gram, 100 square meters per gram to 1000 square meters per gram, or 300 square meters per gram to 600 square meters per gram.

In another embodiment, the porous metal inorganic support includes one or more stabilizers, which may be added to the metal inorganic support. For example, in various embodiments, the metal inorganic support including predominantly alumina has smaller amounts of yttria, zirconia, or ceria added to it. For example, the amount of yttria, zirconia, or ceria may be between about 0.1 percent to 10 percent, 1 percent to 9 percent, or 2 percent to 6 percent, based on the weight of the alumina.

The porous metal inorganic support may be present in the first catalytic composition in an amount that is greater than about 50 mole percent, based on the catalyst system. For example, the amount present may be between about 50 mole percent to 99 mole percent, 55 mole percent to 89 mole percent, 60 mole percent to 79 mole percent, or 94 mole percent to about 99 mole percent of the first catalytic composition, based on the catalyst system.

In one embodiment, the first catalytic composition includes at least one promoting metal. A promoting metal is a metal that enhances the action of a catalyst. In one embodiment, the promoting metal may be selected from the group consisting of gallium, indium, gold, vanadium, zinc, tin, bismuth, cobalt, molybdenum, and tungsten. The promoting metal may be present in an amount between about 0.1 weight percent to 20 weight percent, 0.5 weight percent to 15 weight percent, 1 weight percent to 12 weight percent based upon the total weight of the catalyst system.

The first catalytic composition may be present in an amount of up to about 90 weight percent based upon the total weight of the catalyst system. For example, the first catalytic composition may be present in an amount between about 1 weight percent to 90 weight percent, 20 weight percent to 80 weight percent, or 50 weight percent to 70 weight percent based upon the total weight of the catalyst system. In various embodiments, the ratio is determined by the quantity of species generated on the first bed that are utilized on the second bed. This will depend on several variables specific to the particular exhaust application where the catalyst system may be employed. The type of engine or turbine, the exhaust temperature, the flow rate, concentration of $NO_x$, etc. all factor into determining the ratio of the first catalytic composition to the second catalytic composition. The ratio can be optimized for a particular application in a way such as to achieve the highest $NO_x$ conversion in a given system.

Turning to the second catalyst composition in more detail, in another embodiment, the second catalytic composition includes a second catalytic material disposed upon a second substrate. Suitable materials that may be employed as the second substrate include the inorganic materials described above for the metal inorganic support. The second catalytic material may include an element selected from the group consisting of tungsten, titanium, and vanadium. The function of the second catalytic material includes the use of ammonia or ammonia like products generated by the first catalytic composition as a $NO_x$ reductant to further reduce additional $NO_x$ in the exhaust gas.

The second catalytic material may be present in the second catalytic composition in an amount up to about 50 mole percent, based on the amount of the catalyst system. For example, the second catalytic material may be present in the second catalytic composition in an amount between about 0.025 mole percent to 50 mole percent, 0.5 mole percent to 40 mole percent, or 1.0 mole percent to 30 mole percent, based on the amount of the catalyst system. In one embodiment, the amount of second catalytic material in the second catalytic composition is about 1.5 mole percent, based on the amount of the catalyst system. In another embodiment, the amount of second catalytic material in the second catalytic composition is about 5 mole percent, based on the amount of the catalyst system.

In one embodiment, the second catalytic composition may include a zeolite. In one embodiment, the zeolite is free of additional metals, i.e., the aluminum and silicon metal ions in the zeolite are not exchanged with any other metal ions, for example, iron or copper ions. The zeolites may be naturally occurring or synthetic. Examples of suitable zeolites include, but are not limited to, zeolite Y, zeolite beta, ferrierite, mordenite, ZSM-5, ZSM-12, ZSM-22, ZSM-23, ZSM-34, ZSM-35, ZSM-38, ZSM-48, ZSM-50, ZSM-57, zeolite A, zeolite X, or a combination including at least two of the foregoing zeolites. In one embodiment, the second catalytic composition is essentially entirely ferrierite. An exemplary zeolite is a ferrierite having a silicon to aluminum ratio between about 10 to 30, 12 to 25, or 15 to 20. In one embodiment, the zeolite includes additional metals, i.e., the aluminum and silicon metal ions in the zeolite are exchanged with any other metal ions, for example, iron or copper ions. Examples of such ion-exchanged zeolites include iron zeolite and copper zeolite. In certain embodiments, the second catalytic composition may include iron zeolite disposed upstream of copper zeolite. The iron zeolite and copper zeolite may be disposed in two separate beds or in a single bed that transitions from iron zeolite to copper zeolite. Such a configuration with iron zeolite disposed upstream of copper zeolite may make better use of ammonia generated by the first catalytic composition to reduce $NO_x$ in the exhaust gas than a configuration with copper zeolite disposed upstream of iron zeolite.

Examples of commercially available zeolites that may be used in the second catalytic composition are marketed under the following trademarks: CBV100, CBV300, CBV400, CBV500, CBV600, CBV712, CBV720, CBV760, CBV780, CBV901, CP814E, CP814C, CP811C-300, CP914, CP914C, CBV2314, CBV3024E, CBV5524G, CBV8014, CBV28014, CBV10A, CBV21A, CBV90A, or the like, or a combination including at least two of the foregoing commercially available zeolites.

The zeolite particles may be in the form of extrudates and generally have an average particle size of up to about 2 millimeters. For example, the zeolite particles may have an average particle size between about 0.001 millimeters to 1.1 millimeters, 0.1 millimeters to 0.9 millimeters, or 0.2 millimeters to 0.8 millimeters. In an exemplary embodiment, the zeolite particles have an average particle size of about 0.001 millimeter.

The zeolite particles may have a surface area of up to about 600 square meters per gram. For example, the zeolite particles may have a surface area between about 50 square meters per gram to 600 square meters per gram, 80 square meters per gram to 500 square meters per gram, or 100 square meters per gram to 400 square meters per gram. A high specific surface area typically results in more efficient conversion in addition to other factors including unit cell sizes, pore sizes, type of catalytic material, and exchanged metals.

The second catalytic composition may be used in an amount of up to about 80 weight percent based upon the total weight of the catalyst system. For example, the second catalytic composition may be used in an amount between about 20 weight percent to 70 weight percent, 30 weight percent to 60 weight percent, or 40 weight percent to 50 weight percent based upon the total weight of the catalyst system. In addition, the second catalytic material may be present in the second catalytic composition in an amount selected from the same range amounts of the first catalytic material in the metal inorganic support as described for the first catalytic composition above.

Turning to the third catalyst composition in more detail, in one embodiment, the catalyst system further includes a third catalytic composition disposed downstream from the second catalytic composition. The third catalytic composition includes a third catalytic material disposed on a third substrate. The third catalytic material is typically used to oxidize any unwanted products of reaction or unused reactants or reductants. Specifically, the third catalytic material may be selected from the group consisting of platinum, palladium, ruthenium, rhodium, osmium, and iridium. The third catalytic material may be present in the third catalytic composition in an amount up to about 50 mole percent. For example, the third catalytic material may be present in the third catalytic composition in an amount between about 0.025 mole percent to 50 mole percent, 0.5 mole percent to 40 mole percent, or 1.0 mole percent to 30 mole percent. In one embodiment, the amount of third catalytic material in the third catalytic composition is about 1.5 mole percent. In another embodiment, the amount of third catalytic material in the third catalytic composition is about 5 mole percent.

Suitable materials that may be employed as the third substrate include the inorganic materials described above for the metal inorganic support. In one embodiment, the third substrate may include an inorganic material. In one embodiment, the inorganic materials may include the materials listed above for the metal inorganic support. Suitable materials that may be employed as the third substrate include at least one member selected from the group consisting of alumina, titania, zirconia, ceria, silicon carbide and mixtures thereof.

In one embodiment, the third catalytic composition is a diesel oxidation catalyst (DOC). A DOC is a flow through device that includes a canister containing a honeycomb-like structure or substrate. The third substrate has a large surface area that is coated with an active catalyst layer. This layer contains a small, well-dispersed amount of precious metals, such as platinum or palladium. As the exhaust gases traverse the DOC, carbon monoxide, gaseous hydrocarbons, and liquid hydrocarbon particles (unburned fuel and oil) are oxidized, thereby reducing harmful emissions.

The third catalytic composition may be used in an amount of up to about 90 weight percent based upon the total weight of the catalyst system. For example, the third catalytic composition may be used in an amount between about 10 weight percent to 80 weight percent, or 20 weight percent to 70 weight percent, 30 weight percent to 60 weight percent based upon the total weight of the catalyst system.

Turning to the reductants in more detail, in one embodiment, the catalyst system further includes a delivery system configured to deliver a reductant. When the catalytic composition is employed to reduce $NO_x$ generated in emissions from furnaces, ovens, locomotives, engines, and so forth, a variety of hydrocarbons may be effectively used as a reductant. In one embodiment, the reductant is a hydrocarbon. In one embodiment, the hydrocarbon has an average carbon chain length in the range of about 2 carbon atoms to about 24 carbon atoms. In one embodiment, the reductant is one or more of diesel fuel, ultra-low sulfur diesel fuel, ethanol, gasoline, bio-diesel, and octane. One advantage of using diesel fuel as a reductant is that it is readily available on board vehicles with diesel engines. In one embodiment, the reductant is a hydrocarbon having an average carbon chain length in the range of about 3 carbon atoms or less. In one embodiment, the reductant is one or more of methane, ethylene, and/or propylene. In one embodiment, the reductant is an oxygenated hydrocarbon. In one embodiment, the oxygenated hydrocarbon is ethanol.

In an exemplary embodiment, diesel fuel can be used as a reductant. The catalytic composition can reduce $NO_x$ while using higher hydrocarbons having from about 5 to about 9 carbon atoms per molecule as a reductant. The catalyst system advantageously functions across a variety of temperature ranges. Suitable temperature ranges may include temperatures of greater than about 325 degrees Celsius. Other temperature ranges may include those up to about 400 degrees Celsius.

In certain embodiments, a co-reductant may be used with the hydrocarbon reductant to lower the light off temperature of the catalyst. In one embodiment, the co-reductant is hydrogen. In one embodiment, the amount of co-reductant employed may be between about 0 parts per million to 4000 parts per million, 10 parts per million to 3000 parts per million, or 20 parts per million to 2000 parts per million, based on the total volumetric flow rate of the exhaust. In one embodiment, the amount of co-reductant employed may be in a range of from about 0 parts per million to 1000 parts per million, based on the total volumetric flow rate of the exhaust.

In a method of using the catalyst system, the catalyst system is disposed in the exhaust stream of an internal combustion engine. The internal combustion engine may be part of any of a variety of mobile or fixed assets, for example, an automobile, locomotive, power generator, or the like. Because different engines have different combustion characteristics, the exhaust stream components differ from one system to another. Such differences may include variations in $NO_x$ levels, presence of sulfur, and the presence or quantity of other species of reaction product. Changes in the operating parameters of the engine may also alter the exhaust flow characteristics. Examples of differing operating parameters may include temperature and flow rate. The catalyst may be used to reduce $NO_x$ to nitrogen and oxygen at a desirable rate and at a desirable temperature appropriate for the given system and operating parameters. The catalyst system may be disposed in the exhaust gas path in any of a variety of ways, for example, in powdered form, in the form of an extruded monolith, or as a washcoated substrate. Various techniques for creating such powder beds, extrudates, or coated substrates are known in the art, and may be applied as appropriate for the desired composition and catalyst form. Further, each of the catalytic compositions may be supported separately or on the same support. They may even overlap or be partially mixed.

During operation, the catalyst system can convert the $NO_x$ present in an exhaust stream by about 90 weight percent. For example, the catalyst system can convert the $NO_x$ present in an exhaust stream in an amount between about 10 weight percent to 90 weight percent, 20 weight percent to 80 weight percent, or 30 weight percent to 70 weight percent, based on the weight of the exhaust stream.

EXAMPLES

The following examples illustrate methods and embodiments in accordance with exemplary embodiments, and as such should not be construed as imposing limitations upon the claims. All components are commercially available from common chemical suppliers, such as Sigma-Aldrich Company of St. Louis, Mo., Gelest, Incorporated of Morrisville, Pa., GFS Chemicals, Incorporated of Columbus, Ohio, Umicore of Brussels, Belgium, and the like.

Example

Manufacture of an Exemplary First Catalyst Composition

The catalyst composition was designated as Sample 44-152-1. An amount of TRITON™ X-114 surfactant served as the templating agent. The catalyst composition was manufactured by making a first solution, a second solution, and a third solution, which were mixed together.

The first solution included $AgNO_3$ (0.50 g, 2.96 mmol) and 30 mL of water. These were combined in a 500 mL, 3-necked flask equipped with a syringe pump (Harvard Apparatus syringe pump 22), a condenser, and a mechanical stirrer. The second solution included TRITON™ X-114 (70.18 g), and cyclohexane (50 mL). The second solution was added to the first solution with stirring and held at an ambient temperature. The third solution included $Al(OBu)_3$ (46.9 g, 0.191 mol finally added) and was added to the first and second solutions via the syringe pump over a period of about 110 minutes. The resulting slurry or gel was stirred at ambient temperature for 6 hours. Then the mechanical stirrer was replaced with a stir bar and the contents were heated to reflux for 12 hours.

The contents were cooled and filtered. The obtained solid was subjected to Soxhlet extraction with ethanol. The extracted solid was dried in a vacuum oven at 30 mmHg and 100 degrees Celsius for 24 hours. The dry reaction product was heated under a flow of nitrogen (pyrolyzed) in a tube furnace from room temperature to 550 degrees Celsius at a heating rate of 2 degrees Celsius/minute. Once achieved, the temperature was maintained at 550 degrees Celsius for 1 hour. Afterward, the reaction product was calcined in a flow of air at 550 degrees Celsius for 5 hours to produce the first catalyst composition.

Assembling the Catalyst Systems in Different Configurations.

Base configuration for comparative study: Referring to FIG. 1, a catalyst system 100 for determining the $NO_x$ reducing capabilities of the catalytic composition prepared in the example is provided. The first catalytic composition 112 prepared in the example was placed in a quartz tube 110 having an outer diameter of 2.54 cm. The first catalytic composition 112 prepared in the example was placed inside the quartz tube between two plugs of quartz wool 114 and 116. The bulk volume of the catalytic composition, i.e., the monolith of the first catalytic composition 112 prepared in the example, was 6.08 milliliters. Each plug of quartz wool spanned a length of about 1.27 cm along the length of the quartz tube 110 and weighed about 0.5 grams. The quartz tube 110 was then placed in a furnace. This catalyst system was used in comparative examples CE-1 to CE-3 in Table 2 to show the $NO_x$ reduction properties of the catalyst system.

Figure 2:
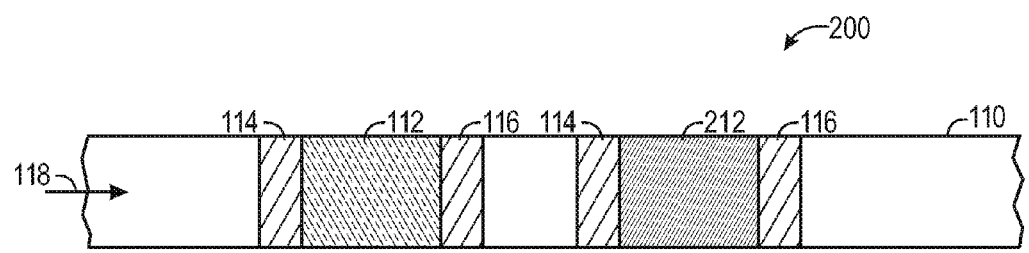
FIG. 2 is a schematic diagram depicting a catalyst system set-up in a furnace in accordance with an embodiment of the invention.

Dual bed configuration in accordance with embodiments of the invention: Referring to FIG. 2, a catalyst system 200 for determining the $NO_x$ reducing capabilities of the first catalytic composition 112 prepared in the example in a dual bed configuration with a second catalytic composition 212 including a commercially purchased copper zeolite or iron zeolite is provided. In this configuration, the first catalytic composition 112 prepared in the example was placed in the quartz tube 110. The first catalytic composition 212 prepared in the example was placed inside the quartz tube between two plugs of quartz wool 114 and 116. A gap of about 2.54 cm was left in the quartz tube 110 and a second pair of plugs of quartz wool 114 and 116 was placed along the length of the quartz tube 110. The second catalytic composition 212, i.e., copper zeolite or iron zeolite catalyst, was placed between the second pair of plugs of quartz wool 114 and 116. The quartz tube 110 was then placed in a furnace. The bulk volume of zeolite monolith used in Examples 3-5 was 3.03 milliliters and in Examples 9-11 was 2.37 milliliters. This catalyst system was used in Examples 3 to 5 (copper zeolite) and 9 to 11 (iron zeolite) (Table 2) to show the $NO_x$ reduction properties of the catalyst system.

Figure 3:
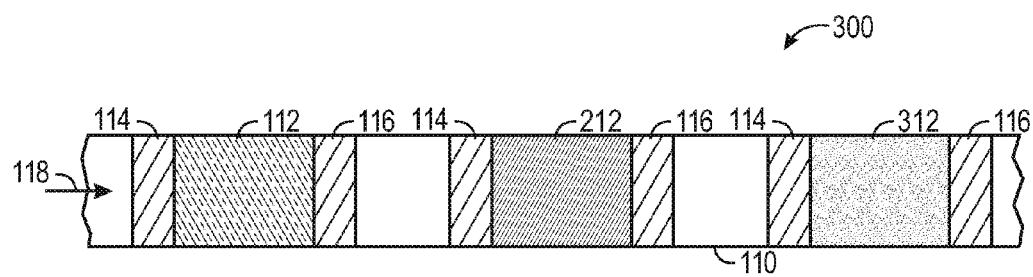
FIG. 3 is a schematic diagram depicting a catalyst system set-up in a furnace in accordance with an embodiment of the invention.

Three-bed configuration in accordance with other embodiments of the invention: Referring to FIG. 3, a catalyst system 300 for determining the $NO_x$ reducing capabilities of a first catalytic composition 112 prepared in the example in a three-bed configuration with the second catalytic composition 212 including a commercially purchased copper zeolite or iron zeolite and the third catalytic composition 312 including a DOC is provided. In this configuration, the first catalytic 112 composition prepared in the example is placed in the quartz tube 110. The first catalytic composition 112 prepared in the example is placed inside the quartz tube 110 between the two plugs of quartz wool 114 and 116. A gap of about 2.54 cm is left in the quartz tube 110 and a second pair of plugs of quartz wool 114 and 116 is placed along the length of the quartz tube 110. The second catalytic composition 212, i.e., copper zeolite or iron zeolite catalyst, is placed between the second pair of plugs of quartz wool 114 and 116. A gap of about 2.54 cm is left in the quartz tube 110 and a third pair of plugs of quartz wool 114 and 116 is placed along the length of the quartz tube 110. The third catalytic composition 312, i.e., DOC (Johnson Matthey, DOC), is placed between the third pair of quartz plugs 114 and 116. The quartz tube 110 was then placed in a furnace.

Additional base configuration for comparative study: Referring to FIG. 3, an additional catalyst system for determining the $NO_x$ reducing capabilities of a first catalytic composition 112 prepared in Example 2 in a dual bed configuration omitting the second catalytic composition 212 and including the third catalytic composition 312 including a DOC is provided. The first and third catalytic compositions 112 and 312 were prepared as described in detail above. This catalyst system was used in comparative examples CE-4 to CE-6 in Table 2 to show the $NO_x$ reduction properties of the catalyst system.

The catalyst system configurations assembled in the quartz tubes 110 as described in FIGS. 1, 2, and 3 were independently placed in the furnace. For these tests, a simulated exhaust stream 118 was discharged into the quartz tube 110. The flow of the simulated exhaust stream 118 through the quartz tube 110 was at a rate of about 3.2 standard liters per minute. The simulated exhaust stream 118 contained nitric oxide (NO; 300 parts per million), water (7 volume percent based on total volumetric flow rate), and oxygen (9 volume percent based on total volumetric flow rate). A reductant stream including ultra low sulfur diesel (ULSD) fuel was also discharged into the quartz tube 110. The ratio of the ULSD fuel to $NO_x$ was such that the ratio of the carbon atoms in the ULSD fuel was about 5 to 6 times that of the NO molecules in the stimulated exhaust stream 118 passed over the catalyst. The ULSD fuel contained less than about 15 parts per million sulfur. The gas stream contained 300 parts per million NO. Hence the ratio of carbon:NO of 5:1 translated to about 1500 parts per million carbon atoms from the ULSD fuel. The temperatures in the furnace during the experiments were 400, 350, and 300 degrees Celsius.

Comparative examples CE-1 to CE-3 provide data on $NO_x$ reduction using a base configuration described in FIG. 1. Comparative examples CE-4 to CE-6 provide data on $NO_x$ reduction using a base configuration that includes a second bed of DOC. Examples 3 to 5 provide data on $NO_x$ reduction using a dual bed catalyst system wherein the first bed includes monolith coated with porous alumina described in the example and the second bed includes copper zeolite. Examples 6 to 8 provide data on $NO_x$ reduction using a three-bed catalyst system wherein the first bed includes monolith coated with porous alumina described in the example, the second bed includes copper zeolite, and the third bed includes the DOC. Examples 9 to 11 provide data on $NO_x$ reduction using a dual bed catalyst system wherein the first bed includes monolith coated with porous alumina described in the example and the second bed includes iron zeolite. Finally, examples 12 to 14 provide data on $NO_x$ reduction using a three-bed catalyst system wherein the first bed includes monolith coated with porous alumina described in the example, the second bed includes iron zeolite, and the third bed includes the DOC.

TABLE 2

| Example | Temperature in degrees Celsius | $NO_x$ conversion in percentage |
|---------|-------------------------------|--------------------------------|
| CE-1 | 400 | 87.1 |
| CE-2 | 350 | 77.6 |
| CE-3 | 300 | 47.9 |
| CE-4 | 400 | 62.1 |
| CE-5 | 350 | 53.3 |
| CE-6 | 300 | 34.6 |
| Example 3 | 400 | 97.4 |
| Example 4 | 350 | 90.6 |
| Example 5 | 300 | 64.9 |
| Example 6 | 400 | 93.6 |
| Example 7 | 350 | 81.7 |
| Example 8 | 300 | 46.4 |
| Example 9 | 400 | 85.9 |
| Example 10 | 350 | 77.5 |
| Example 11 | 300 | 64.7 |
| Example 12 | 400 | 69.1 |
| Example 13 | 350 | 61.3 |
| Example 14 | 300 | 48.5 |

From the results, it can be seen that the catalyst systems of Examples 3-8 including the first catalytic composition 112 including a mixture of the porous alumina with silver and the second catalytic composition 212 including copper zeolite showed superior $NO_x$ conversion than the porous alumina with silver alone as shown in comparative examples CE-1 to CE-6. Use of the catalyst system including the first catalytic composition 112 including a mixture of the homogeneous solid mixture including silver and metal inorganic support, the second catalytic composition 212 including copper zeolite, and the third catalytic composition 312 including DOC provided superior $NO_x$ conversion than the porous alumina with silver alone.

As used herein the term "bulk volume" means the volume calculated using the outer dimensions of the monolith. As used herein, the term "ammonia ($NH_3$)-slip" is the amount of ammonia (in ppm of total volumetric flow) that is left after the specified catalyst. This could be after the first or second bed, depending on how it is described. As used herein the term space velocity represents the relation between volumetric flow and catalyst system bed volume. As a matter of definition, the term "diesel" refers to the distillate commonly available to operate in a diesel engine. While those of skill in the art will recognize that diesel fuel may vary in its precise mixture, the term diesel encompasses all such varieties in mixture commonly available. This may include diesel fuel derived from a variety of sources, including for example, bio-diesel and petro-diesel. ULSD refers to specific blends of diesel fuel commonly used in automotive engines that have very low sulfur levels. Similarly, the term "gasoline" is used to refer to any of the blends of distillate commonly available to operate in a gasoline engine.

In the embodiments described in detail below, there is provided an exhaust system that includes a fuel delivery system configured to deliver a fuel to an engine, an exhaust stream path configured to receive an exhaust stream from the engine, a reductant delivery system configured to deliver a reductant to the exhaust stream path, and a catalyst system disposed in the exhaust stream path. The catalyst system includes at least a first catalytic composition and a second catalytic composition, and may also include a third catalyst composition as described above. In certain embodiments, the reductant delivery system further includes a co-reductant.

Figure 4:
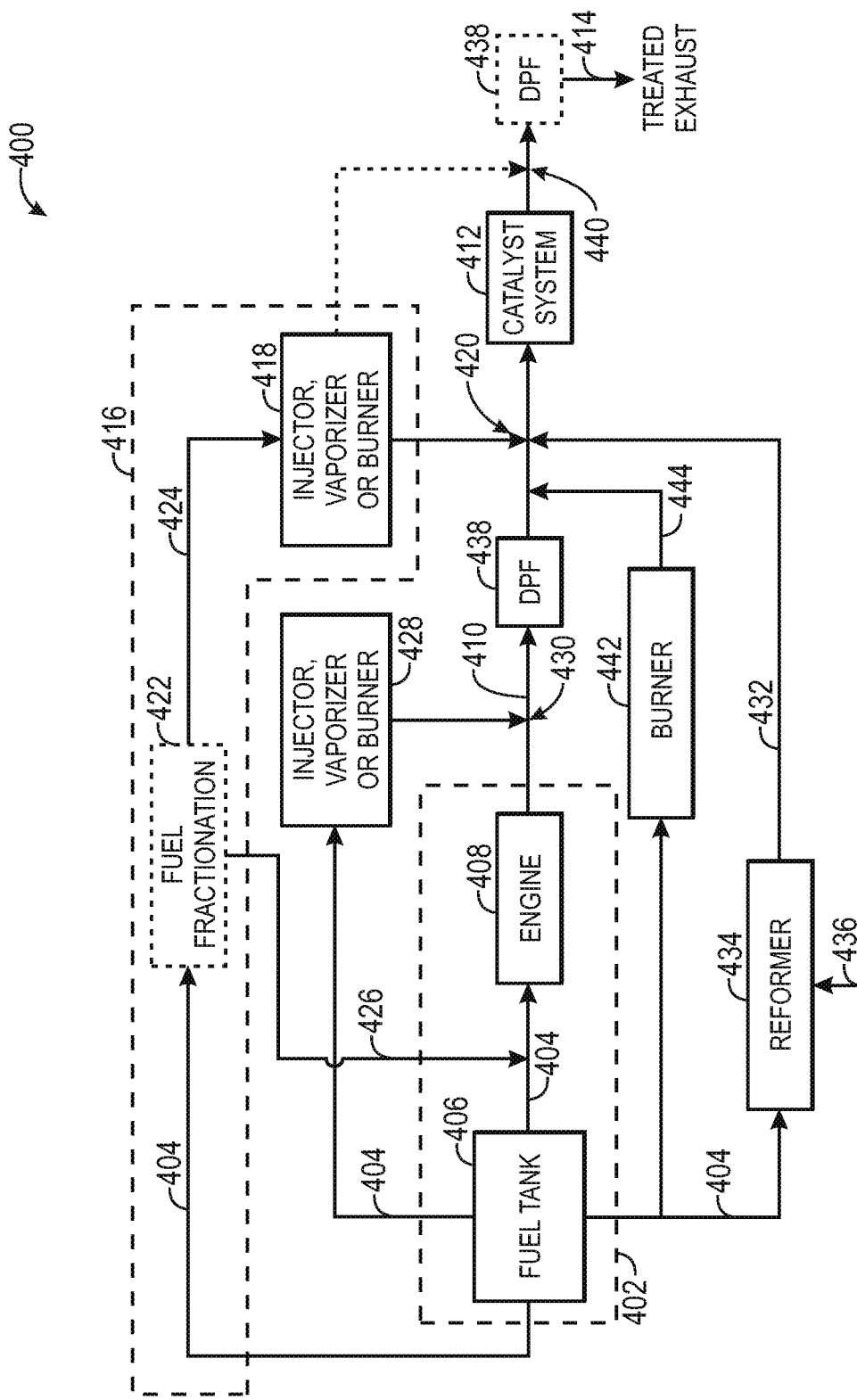
FIG. 4 is a schematic diagram depicting an exhaust system comprising a catalyst system set-up in accordance with an embodiment of the invention.

Referring to FIG. 4, an exhaust system 400 capable of reducing $NO_x$ is provided. The exhaust system 400 includes a fuel delivery system 402, which is configured to deliver a fuel 404 contained in a fuel tank 406 to an engine 408. In an exemplary embodiment, the fuel 404 may include ULSD. The engine 408 can be any form of internal combustion engine, which produces exhaust (reciprocating or rotating) and can operate on a variety of fuel sources including gas, bio-diesel, diesel, and natural gas. The engine 408 generates an exhaust stream 410, which is passed through a catalyst system 412 to provide a treated exhaust stream 414. The catalyst system 412 may include the catalyst system configurations described herein above in the example section. The fuel delivery system 402 may also include a reductant delivery system 416 configured to deliver a reductant.

In one embodiment, the reductant is the fuel 404. The reductant including the fuel 404 is directly delivered to the catalyst system 412 from the fuel tank 406 via an injector, vaporizer, or burner 418 through the point of injection 420. The reductant can either be vaporized and delivered as a gas stream or be atomized or sprayed into the exhaust (or onto the catalyst system) with an injector. In an alternative embodiment, the reductant delivery system 416 further includes a fuel fractionator 422, shown hatched in FIG. 4. In such an embodiment, the reductant including the fuel 404 is first passed through the fuel fractionator 422 to provide a light fuel fraction 424 and a heavy fuel fraction 426. The light fuel fraction 424 includes hydrocarbons having an average carbon chain length of less than about 12 carbons and the heavy fuel fraction 426 includes hydrocarbons having an average carbon chain length of greater than about 12 carbons. The heavy fuel fraction 426 is delivered to the engine 408 through the fuel 404. The light fuel fraction 424 is delivered to the catalyst system 412 from the fuel tank 406 via the injector, vaporizer, or burner 418 through the point of injection 420.

In one embodiment, a portion of the fuel 404 may be delivered to the catalyst system 412 by the exhaust stream 410 from the fuel tank 412 via an injector, vaporizer, or burner 428 through the point of injection 430. In one embodiment, the reductant delivery system 416 further includes a co-reductant 432. In one embodiment, the co-reductant 432 may be generated by passing the fuel 404 through a reformer 434. A source of oxygen 436 (most likely from air) is provided to the reformer 434. Carbon monoxide, carbon dioxide and water, can also be generated in the reforming process. For example, in one embodiment, the co-reductant 432 generated by the reformer 434 includes a syngas including hydrogen and carbon monoxide. The reformer 434 may also perform water gas shift reaction to increase yield of hydrogen. The co-reductant 432 is passed through the catalyst system 412 through the point of injection 420.

A diesel particulate filter (DPF) 438 is an optional piece of equipment that may be located either upstream or downstream of the catalyst system 412. The purpose of the DPF is to remove particulate matter (soot and ash) from the exhaust stream. In certain embodiments, the DPF may be paired with a diesel injector to regenerate the DPF by burning off soot. In one embodiment, the DPF 438 is located between the engine 408 and the catalyst system 412 before the point of injection 420. In this embodiment, the reductant including the fuel 404 or the light fuel fraction 424, and the co-reductant 432 are delivered to the catalyst system 412 through the point of injection 420 after the exhaust stream 410 is passed through the DPF 438. In an alternative embodiment (shown hatched in FIG. 4), a DPF 438 is located after the catalyst system 412 and the exhaust stream 410 is passed through the catalyst system 412 and the DPF 438 before exiting as the treated exhaust stream 414. In this embodiment, the reductant including the fuel 404 or the light fuel fraction 424, shown hatched in FIG. 4, is delivered to the exhaust stream 410 through the point of injection 440.

A burner 442 burns diesel fuel to increase the temperature of the exhaust stream, which can be used to improve the performance of the catalyst in situations where the exhaust temperature is below the optimum operating conditions of the catalyst. The burner 442 is placed upstream of the diesel and the reformer injection 420, which is just before the catalyst system 412. In the case where DPF 438 is upstream of the catalyst system 412, the burner 442 may be upstream or downstream of DPF 438. In one embodiment, the burner 442 is provided between the fuel tank 406 and the catalyst system 412. In this embodiment, the output of the burner 444 may be located upstream of the point of injection 420 of the reductant including the fuel 404 or light fuel fraction 424, and the co-reductant 432 in the exhaust stream 410. Additionally the exhaust system 400 may include other equipment, such as pumps, valves, sensors, control loops, computers (control logic), storage tanks, mixers (gas or liquid), insulation, flow paths, separators, etc.

In certain embodiments wherein the reductant is not the same as the fuel, a separate reductant tank can be used to contain the reductant as will be explained in the description of figures provided below. In embodiments where the reductant is not the fuel, the reductants may include ethanol, gasoline, a mixture of ethanol and gasoline, and/or a mixture of ethanol and diesel.

Figure 5:
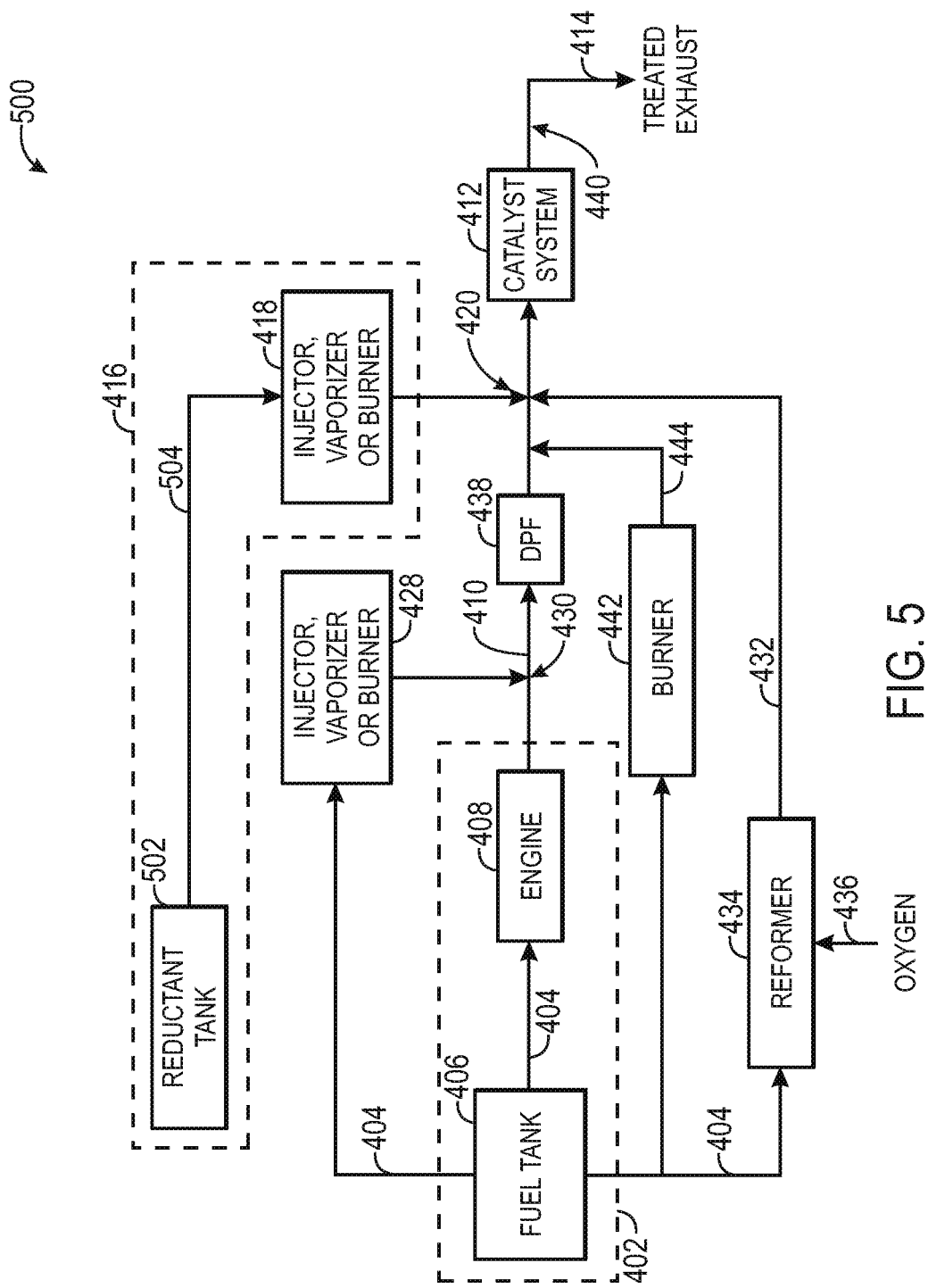
FIG. 5 is a schematic diagram depicting an exhaust system comprising the catalyst system set-up in accordance with an embodiment of the invention.

Referring to FIG. 5, an exhaust system 500 capable of reducing $NO_x$ is provided. Elements in FIG. 5 in common with those shown in FIG. 4 are labeled with the same reference numerals. The reductant delivery system 416 is configured to deliver a reductant. In one embodiment, the reductant is not the same as the fuel. In this embodiment, a reductant tank 502 is provided to deliver the reductant 504 to the catalyst system 412 via the injector, vaporizer, or burner 418 to the point of injection 420. Other aspects of the exhaust system 500 are similar to those described above for the exhaust system 400 of FIG. 4.

Figure 6:
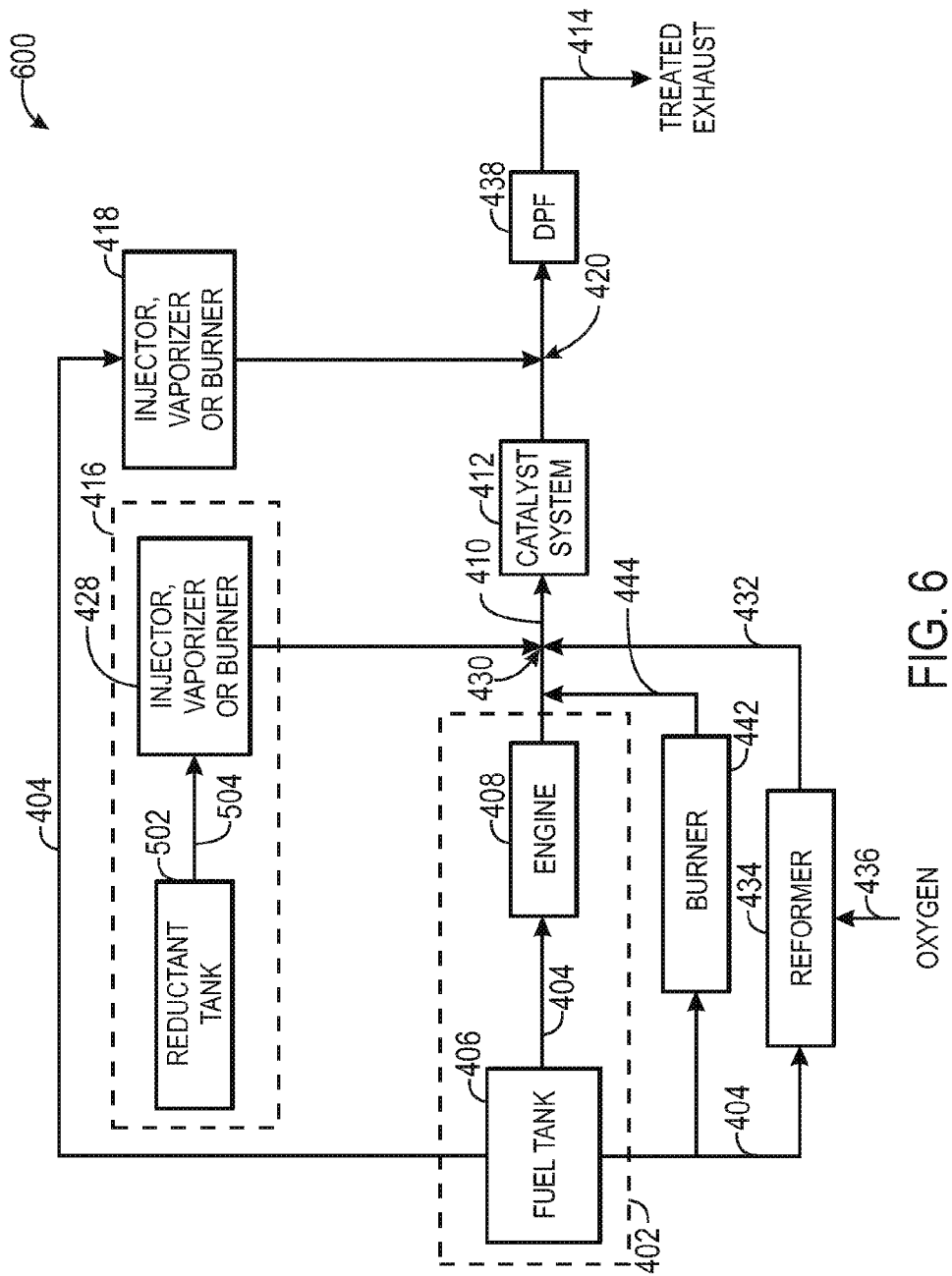
FIG. 6 is a schematic diagram depicting an exhaust system comprising the catalyst system set-up in accordance with an embodiment of the invention.

Referring to FIG. 6, an exhaust system 600 capable of reducing $NO_x$ is provided. Elements in FIG. 6 in common with those shown in FIGS. 4 and 5 are labeled with the same reference numerals. In this embodiment, the reductant tank 502 is provided to deliver the reductant 504 to the exhaust stream 410 from the reductant tank 502 via the injector, vaporizer, or burner 428. The exhaust stream 410 carries the reductant 502 to the catalyst system 412 through the point of injection 430. In one embodiment, a portion of the fuel 404 is delivered to the catalyst system 412 from the fuel tank 406 via the injector, vaporizer, or burner 418 through the point of injection 420. Other aspects of the exhaust system 600 are similar to those described above for the exhaust system 400 of FIG. 4.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A catalyst system comprising:
   a first catalytic composition comprising,
      a homogeneous solid mixture containing a first catalytic material disposed on a first substrate; wherein pores of the solid mixture have an average diameter of greater than about 45 nanometers; and
   a second catalytic composition comprising at least one of,
      (i) a zeolite, or
      (ii) a second catalytic material disposed on a second substrate, the second catalytic material comprising an element selected from the group consisting of tungsten, titanium, and vanadium.

2. The catalyst system of claim 1, wherein the first catalytic material includes alkali metals, alkaline earth metals, transition metals, silver, platinum, gold, palladium, iron, nickel, cobalt, gallium, indium, ruthenium, rhodium, osmium, iridium, or combinations of at least two of the foregoing metals.

3. The catalyst system of claim 1, wherein the first substrate includes an inorganic oxide.

4. The catalyst system of claim 1, wherein first catalyst composition comprises at least one promoting metal selected from the group consisting of gallium, indium, gold, vanadium, zinc, tin, bismuth, cobalt, molybdenum, and tungsten.

5. The catalyst system of claim 1, wherein the zeolite includes iron zeolite, copper zeolite, zeolite Y, zeolite beta, mordenite, ferrierite, ZSM-5, ZSM-12, ZSM-22, ZSM-23, ZSM-34, ZSM-35, ZSM-38, ZSM-48, ZSM-50, ZSM-57, zeolite A, zeolite X, or a combination comprising at least two of the foregoing zeolites.

6. The catalyst system of claim 1, wherein the zeolite includes iron zeolite disposed upstream of copper zeolite.

7. The catalyst system of claim 1, wherein the second substrate includes at least one member selected from the group consisting of alumina, titania, zirconia, ceria, silicon carbide and mixtures thereof.

8. The catalyst system of claim 1, comprising a third catalytic composition disposed downstream from the second catalytic composition, the third catalytic composition comprising a third catalytic material disposed on a third substrate, wherein the third catalytic material is selected from the group consisting of platinum, palladium, ruthenium, rhodium, osmium, and iridium.

9. The catalyst system of claim 8, wherein the third substrate includes at least one member selected from the group consisting of alumina, titania, zirconia, ceria, silicon carbide and mixtures thereof.

10. The catalyst system of claim 1, comprising a delivery system configured to deliver a reductant.

11. The catalyst system of claim 10, wherein the reductant is a hydrocarbon, an oxygenated hydrocarbon, diesel fuel, ultra-low sulfur diesel fuel, bio-diesel, ethanol, gasoline, octane, or a combination thereof.

12. The catalyst system of claim 11, wherein the hydrocarbon has an average carbon chain length in a range of about 2 carbon atoms to about 24 carbon atoms.

13. The catalyst system of claim 10, wherein the delivery system includes a co-reductant.

14. The catalyst system of claim 13, wherein the co-reductant is hydrogen.

15. A catalyst system comprising:
    a first catalytic composition comprising,
       a first catalytic material disposed on a first substrate;
    a second catalytic composition comprising at least one of,
       (i) a zeolite, or
       (ii) a second catalytic material disposed on a second substrate, the second catalytic material comprising an element selected from the group consisting of tungsten, titanium, and vanadium; and
    a third catalytic composition disposed downstream from the second catalytic composition, the third catalytic composition comprising,
       a third catalytic material disposed on a third substrate, wherein the third catalytic material is selected from the group consisting of platinum, palladium, ruthenium, rubidium, osmium, and iridium.

16. The catalyst system of claim 15, wherein the first catalytic composition comprises at least one promoting metal selected from the group consisting of gallium, indium, gold, vanadium, zinc, tin, bismuth, cobalt, molybdenum, and tungsten.

17. The catalyst system of claim 15, wherein the zeolite includes iron zeolite, copper zeolite, zeolite Y, zeolite beta, mordenite, ferrierite, ZSM-5, ZSM-12, ZSM-22, ZSM-23, ZSM-34, ZSM-35, ZSM-38, ZSM-48, ZSM-50, ZSM-57, zeolite A, zeolite X, or a combination comprising at least two of the foregoing zeolites.

18. The catalyst system of claim 15, wherein the zeolite includes iron zeolite disposed upstream of copper zeolite.

19. The catalyst system of claim 15, wherein the first substrate, the second substrate, and the third substrate independently include at least one member selected from the group consisting of alumina, titania, zirconia, ceria, silicon carbide and mixtures thereof.

20. The catalyst system of claim 15, comprising a delivery system configured to deliver a reductant.

21. The catalyst system of claim 15, wherein the delivery system includes a co-reductant.

22. An exhaust system comprising:
    a fuel delivery system configured to deliver a fuel to an engine;
    an exhaust stream path configured to receive an exhaust stream from the engine;
    a reductant delivery system configured to deliver a reductant to the exhaust stream path; and
    a catalyst system disposed in the exhaust stream path, wherein the catalyst system includes:
       a first catalytic composition comprising,
          a homogeneous solid mixture containing a first catalytic material disposed on a first substrate; wherein pores of the solid mixture have an average diameter of greater than about 45 nanometers; and
       a second catalytic composition comprising at least one of,
          (i) a zeolite, or
          (ii) a second catalytic material disposed on a second substrate, the second catalytic material comprising an element selected from the group consisting of tungsten, titanium, and vanadium.

23. The exhaust system of claim 22, comprising a third catalytic composition disposed downstream from the second catalytic composition, the third catalytic composition comprising a third catalytic material disposed on a third substrate, wherein the third catalytic material is selected from the group consisting of platinum, palladium, ruthenium, rhodium, osmium, and iridium.

24. The exhaust system of claim 22, wherein the reductant is a hydrocarbon, an oxygenated hydrocarbon, diesel fuel, ultra-low sulfur diesel fuel, bio-diesel, ethanol, gasoline, octane, or a combination thereof.

25. The exhaust system of claim 24, wherein the hydrocarbon has an average carbon chain length in the range of about 2 carbon atoms to about 24 carbon atoms.

26. The exhaust system of claim 22, wherein the delivery system includes a co-reductant.

27. The exhaust system of claim 26, wherein the co-reductant is hydrogen.

28. The exhaust system of claim 22, wherein first catalyst composition comprises at least one promoting metal selected from the group consisting of gallium, indium, gold, vanadium, zinc, tin, bismuth, cobalt, molybdenum, and tungsten.

* * * * *